(12) United States Patent
Okuda

(10) Patent No.: US 9,221,413 B2
(45) Date of Patent: Dec. 29, 2015

(54) VEHICLE IMPACT-ABSORBING MEMBER

(71) Applicant: TOYOTA SHATAI KABUSHIKI KAISHA, Aichi (JP)

(72) Inventor: Nobuhisa Okuda, Aichi (JP)

(73) Assignee: Toyota Shatai Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 14/368,482

(22) PCT Filed: Dec. 5, 2012

(86) PCT No.: PCT/JP2012/081520
§ 371 (c)(1),
(2) Date: Jun. 24, 2014

(87) PCT Pub. No.: WO2013/099542
PCT Pub. Date: Jul. 4, 2013

(65) Prior Publication Data
US 2014/0346789 A1    Nov. 27, 2014

(30) Foreign Application Priority Data
Dec. 26, 2011 (JP) .................. 2011-283389

(51) Int. Cl.
*B60R 19/03* (2006.01)
*B60R 19/34* (2006.01)
*F16F 7/12* (2006.01)

(52) U.S. Cl.
CPC ................. *B60R 19/34* (2013.01); *B60R 19/03* (2013.01); *F16F 7/12* (2013.01)

(58) Field of Classification Search
CPC ............. B27L 7/00; B27L 11/02; B27C 1/12; C04B 28/32; C04B 1/10; C08G 18/10; C08G 18/3206; A63B 2053/0408; A63B 2053/0416; A63B 53/0466
USPC ............... 293/122, 117; 280/748; 296/187.03
See application file for complete search history.

(56) References Cited

U.S. PATENT DOCUMENTS

| | | | |
|---|---|---|---|
| 2012/0270044 A1 | 10/2012 | Shiina et al. | |
| 2013/0306419 A1* | 11/2013 | Okuda | ........................ 188/377 |
| 2014/0124315 A1* | 5/2014 | Okuda | ........................ 188/376 |
| 2014/0265071 A1* | 9/2014 | Garrow et al. | ................ 267/140 |
| 2014/0305757 A1* | 10/2014 | Okuda | ........................ 188/371 |
| 2014/0312541 A1* | 10/2014 | Metz | ............................ 267/139 |

FOREIGN PATENT DOCUMENTS

| | | |
|---|---|---|
| JP | S58-18853 | 2/1983 |
| JP | 2001-182769 A | 7/2001 |
| JP | 2004-322733 A | 11/2004 |
| WO | WO 2005/037518 A1 | 4/2005 |

* cited by examiner

Primary Examiner — Kiran B Patel
(74) Attorney, Agent, or Firm — Christensen Fonder PA

(57) ABSTRACT

A vehicle impact-absorbing member has a columnar wood member and a hollow cylindrical metal frame body covering side-surfaces of the wood member and is configured to axially receive a compression load caused by impact in the event of a collision in an axial direction of wood member. The frame body may have a square cylindrical shape. A ratio of an outer side in a hollow square cross-sectional surface of the frame body to a thickness of the frame body is set to a range of 9-12.

1 Claim, 14 Drawing Sheets

VEHICLE IMPACT-ABSORBING MEMBER

PRIORITY CLAIM

The present application is a National Phase entry of PCT Application No. PCT/JP2012/081520, filed Dec. 5, 2012, which claims priority from Japanese Patent Application No. 2011-283389, filed Dec. 26, 2011, the disclosures of which are hereby incorporated by reference herein in their entirety.

BACKGROUND OF THE INVENTION

1. Field of the Invention

The present invention relates to a vehicle impact-absorbing member. More particularly, the present invention relates to a vehicle impact-absorbing member having a columnar wood member and a hollow cylindrical metal frame body covering side-surfaces of the wood member and configured to axially receive a compression load caused by impact.

2. Description of the Related Art

Such a vehicle impact-absorbing member is taught, for example, by JP 2001-182769A (which will be hereinafter referred to as a document). In the impact-absorbing member taught by the document, a wood member is substantially closely or slightly tightly fitted into a frame body made of an aluminum hollow member. In particular, a wood member is fitted into a frame body having a hollow square shape of 40 mm square in cross section taken along a line perpendicular to an axial direction, a length of 120 mm in the axial direction and a thickness of 2 mm. The document shows that the wood member is fitted into the frame body, so that change of a reactive force caused by displacement of the impact-absorbing member due to impact applied thereto can be restricted. Further, a fiber direction of the wood member is aligned with the axial direction of the frame body, so as to increase an absorption amount of impact energy.

SUMMARY OF THE INVENTION

When the impact-absorbing member manufactured in accordance with an embodiment described in the document is axially compressed, the frame body undergoes buckling distortion into a bellows-shape while it is largely folded alternately inward and outward. Further, the frame body folded inward may bite into the wood member, so that a deformation direction of fiber of the wood member may be locally inclined. The wood member may be basically porous. Further, the fiber of the wood member may generally be unidirectionally-aligned. Therefore, if a fiber direction of the wood member can be aligned with a compression direction such that the wood member can be linearly compressed in the fiber direction, it is expected that the wood member can exploit its innate characteristics at maximum by a simple structure where the wood member is fitted into the frame body, so as to increase absorption amount of impact energy.

In one aspect of the present invention, a vehicle impact-absorbing member may have a columnar wood member and a hollow cylindrical metal frame body covering side-surfaces of the wood member and may be configured to axially receive a compression load caused by impact in the event of a collision in an axial direction of wood member. The frame body may have a square cylindrical shape. A ratio of an outer side in a hollow square cross-sectional surface of the frame body to a thickness of the frame body may be set to a range of 9-12. In another embodiment, the frame body may have a regular N-polygonal cylindrical shape satisfying N≥5 or a regular circular cylindrical shape. A further embodiment, the frame body may have an elliptical cylindrical shape. A ratio of an inner major axis a to an inner minor axis b in a hollow elliptical cross-sectional surface of the frame body, i.e., a ratio a/b, is set to 3 or less.

DETAILED DESCRIPTION OF THE INVENTION

An impact-absorbing member is a member that is attached to a vehicle such as an automobile in order to absorb impact energy generated in the event of a collision. A impact-absorbing member attaching position of the vehicle is not specially limited provided that the impact-absorbing member can absorb a collision energy in order to protect passengers, pedestrians or other such person. For example, the impact-absorbing member may be positioned between a fender panel and a body panel, between a bumper reinforcement member and a side member, between a door panel and a door trim, between a pillar and pillar trim, between a roof panel and a roof liner, and between a floor panel and a carpet. In the following, embodiments of the present invention will be described in detail with reference to the drawings.

Embodiment 1

Figure 1:
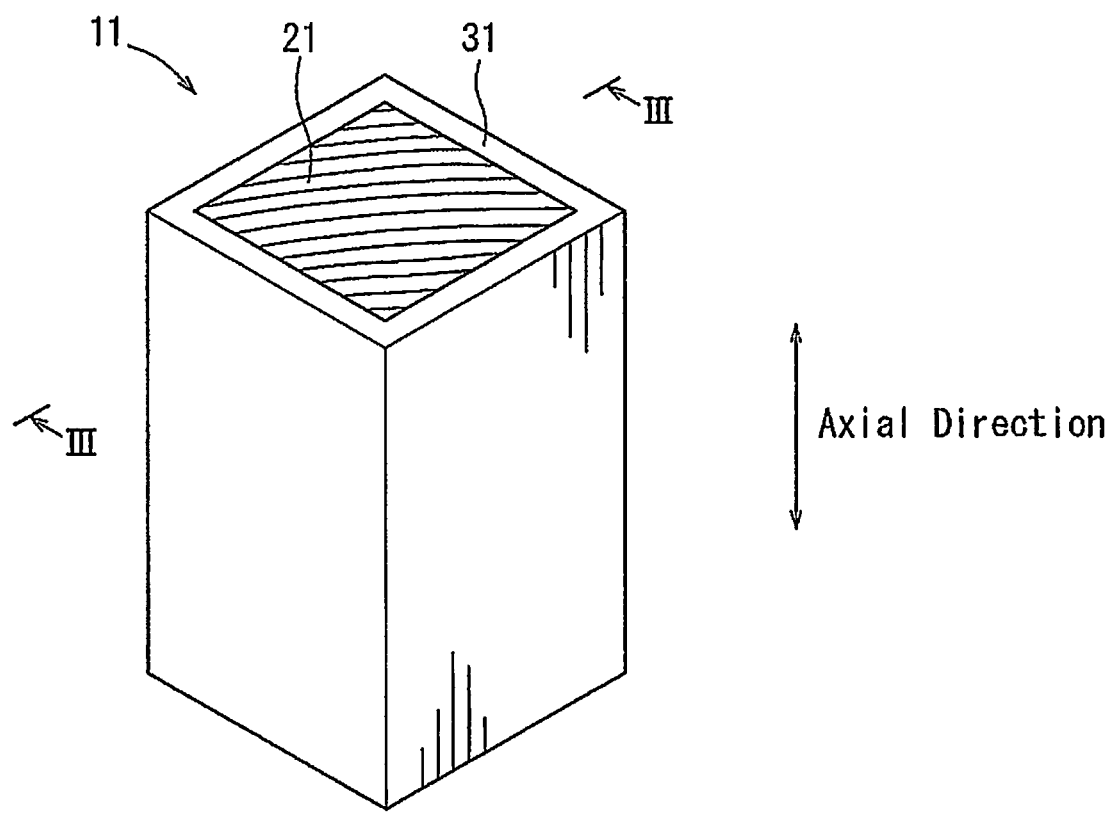
FIG. 1 is a perspective view of a impact-absorbing member according to Embodiment 1.

As shown in FIG. 1, an impact-absorbing member 11 of the present embodiment may be composed of a rectangular columnar-shaped wood member 21 having a square shape in "cross section taken along a line perpendicular to an axial direction thereof" (which will be hereinafter simply referred to as "cross section"), and a metal frame body 31 covering side-surfaces of the wood member 21. The impact-absorbing member 11 may be positioned so as to receive impact in the event of a collision in the axial direction of the rectangular column.

The wood member 21 may be sawn up to a rectangular columnar shape such that a fiber direction thereof can be aligned parallel with a compression load (the axial direction). The type of the wood member 21 is not specially limited. For example, the wood member 21 can be formed by a needle leaf tree such as cedar, Japanese cypress and pine or a broad-leaf tree such as Japanese zelkova and beech. A wood member having high specific gravity may be characterized by superior strength. To the contrary, a wood member having low specific gravity may be characterized by an increased amount of compression deformation because of high porosity. Therefore, it is preferable to select a wood member having adequate specific gravity according to the impact-absorbing member attaching position of the vehicle in consideration of such a factor. A wood member having specific gravity of 0.2-0.4 can increase an absorption amount of the impact energy because such a wood member may have a sufficient amount of compression deformation and a certain level of strength. Therefore, such a wood member may be advantageously used. Examples of the wood member having specific gravity of 0.2-0.4 are cedar, Japanese cypress and pine.

The frame body 31 may have a square cylindrical shape, i.e., a hollow cylindrical shape having a hollow square shape in "cross section taken along a line perpendicular to an axial direction thereof" (which will be hereinafter simply referred to as "cross section"). The frame body 31 may support the wood member 21 and may function to be deformed with the wood member 21 due to the compression load in the axial direction. The frame body 31 may preferably be made of aluminum, copper, iron or other such metals. The frame body 31 may be closely fitted around the wood member 21 without clearance, so as to cover the entire side surfaces (the entire outer circumferential surface) of the wood member 21 in just proportion.

Figure 2:
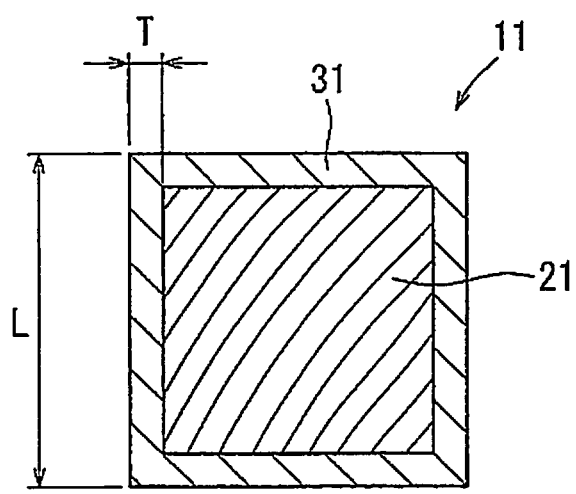
FIG. 2 is a sectional view taken along a line perpendicular to an axial direction of the impact-absorbing member of FIG. 1.

As shown in FIG. 2, a thickness T of the frame body 31 may substantially be uniform. Further, a ratio of an outer side L in a hollow square cross-sectional surface of the frame body 31 to the thickness T, i.e., a ratio L/T (which may be hereinafter referred to as a side to thickness ratio), may be set to a range of 9-12.

Figure 3A:
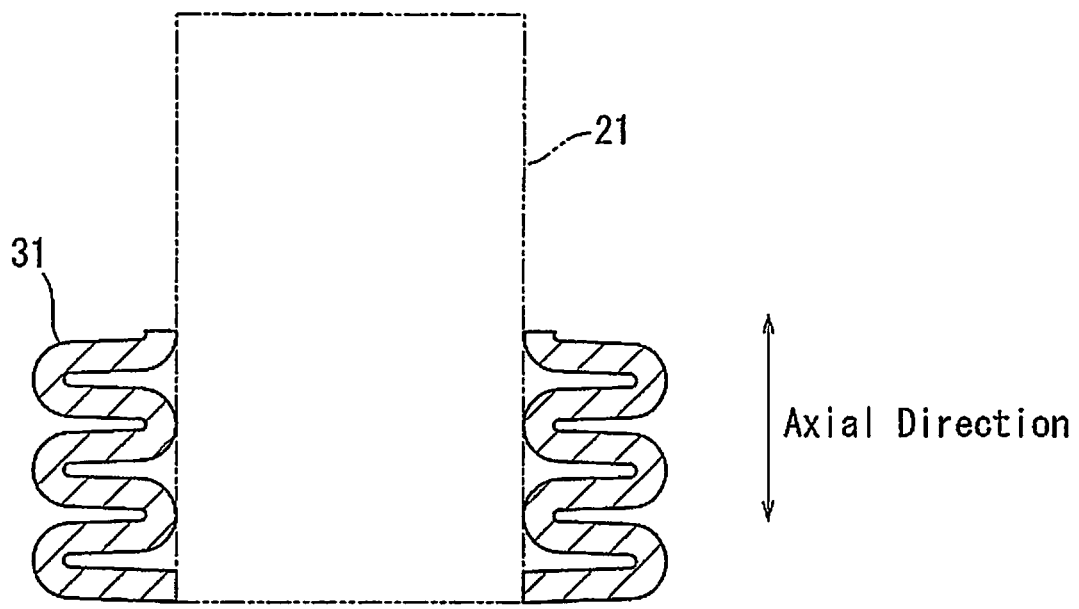
FIG. 3A is a schematic sectional view taken along line III-III of FIG. 1, which view illustrates a deformation form of a frame body of the impact-absorbing member, in which a ratio of an outer side in a hollow square cross-sectional surface to a thickness is in a range of 9-12 according to Embodiment 1.

The impact-absorbing member 11 may be positioned such that the axial direction (a fiber direction) of the wood member 21 can be aligned parallel with a collisional direction of the vehicle. When the impact-absorbing member 11 is subjected to the compression load in the axial direction by the collision, the frame body 31 encircling the wood member 21 may be crashed in the axial direction while it is buckled. As a result, the wood member 21 may be prevented from falling down by the frame body 31, so as to directly undergo compression deformation in the axial direction. At this time, as schematically shown in FIG. 3A, the frame body 31 can undergo buckling distortion while it is repeatedly expanded outward only although the principle is not necessarily known. According to the impact-absorbing member 11, when the compression load in the axial direction is applied thereto, the frame body 31 encircling the wood member 21 may be crashed without changing the axial direction thereof. Therefore, the wood member 21 can linearly undergo compression deformation in the fiber direction without falling down. At this time, the frame body 31 can be crashed while it is expanded outward without protruding inward. Therefore, the frame body 31 may be less likely to bite into the wood member 21. This allows the wood member 21 to exploit its innate characteristics at maximum. Further, when the frame body bites into the wood member, the wood member can be easily cracked because fiber of the wood member may be inclined. Also, deformation behavior of the wood member may be individually different. However, according to the impact-absorbing member of the present embodiment, the frame body 31 may be less likely to bite into the wood member 21. Therefore, the deformation behavior of the wood member can be prevented from being varied, so as to fall within a predictable range. Further, the impact-absorbing member may be less likely to produce change of a reactive force that can be produced when fiber of the wood member is partially inclined due to biting of the frame body into the wood member. Thus, the change of the reactive force can be minimized. As a result, variation of impact-absorbing performance can be minimized.

Figure 3B:
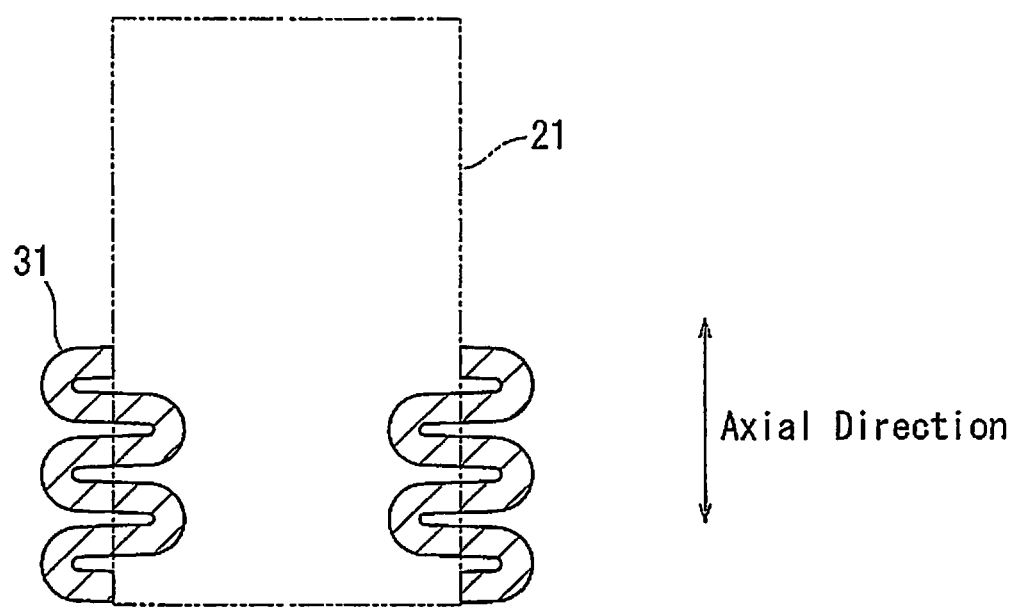
FIG. 3B is a schematic sectional view, which view illustrates a deformation configuration of a frame body of the impact-absorbing member, in which a ratio of the outer side in the hollow square cross-sectional surface to the thickness is out of the range of 9-12.

Further, when the ratio L/T of the side in the cross-sectional surface of the frame body 31 to the thickness thereof is out of the range of 9-12, the frame body 31 can be crashed in the axial direction. However, as shown in FIG. 3B, the frame body 31 can be deformed into a bellows-shape while it is folded in both directions of inward and outward. Therefore, if the wood member 21 is closely fitted into the frame body 31 without clearance, the frame body 31 may be likely to bite into the wood member 21. To the contrary, in the impact-absorbing member 11 of the present embodiment, as previously described, the frame body 31 can be crashed without protruding inward. Therefore, although there is no clearance between the frame body 31 and the wood member 21, the frame body 31 may be less likely to bite into the wood member 21. Naturally, in the present embodiment, the frame body 31 and the wood member 21 can be modified such that any clearance can be formed therebetween. Further, the wood member 21 may not necessarily have square columnar shape. However, it is preferable that the wood member 21 internally contacts the frame body 31 because the wood member 21 can be easily positioned with respect to the frame body 31. Further, it is more preferable that the wood member 21 is closely fitted into the frame body 31 without clearance. This is because strength of the impact-absorbing member 11 can be effectively increased with respect to cross-sectional area thereof and an impact absorption amount thereof can be effectively increased.

Embodiment 2

Figure 4:
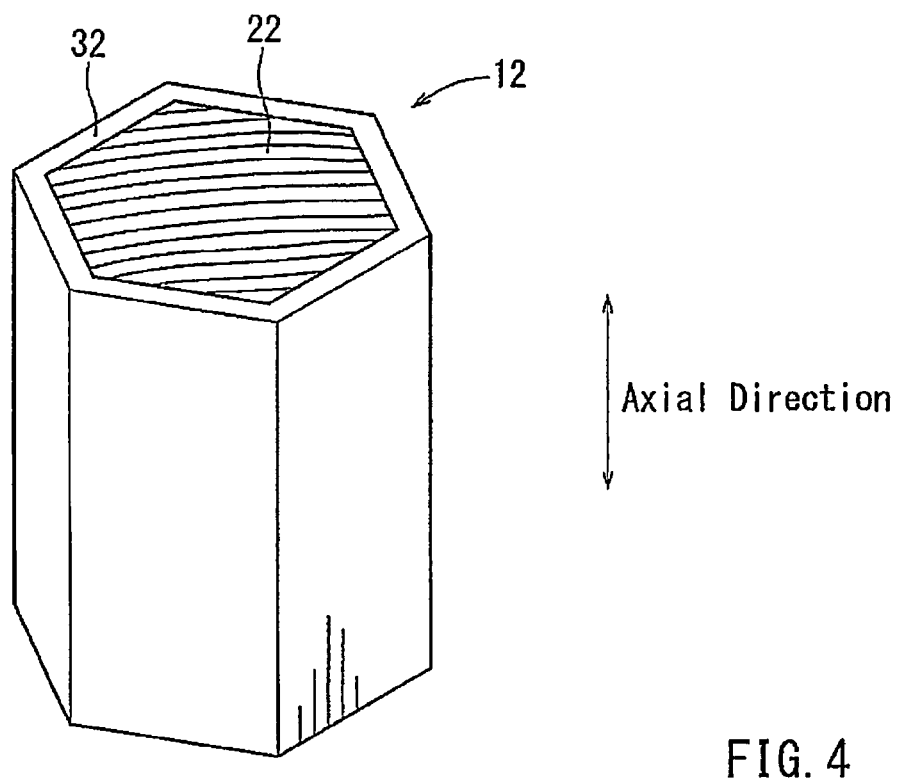
FIG. 4 is a perspective view of an impact-absorbing member according to Embodiment 2.

As shown in FIG. 4, an impact-absorbing member 12 of the present embodiment may be composed of a columnar-shaped wood member 22 having a regular N-polygonal shape in cross section satisfying N≥5, and a metal frame body 32 covering side-surfaces of the wood member 22. The impact-absorbing member 12 may function to receive a compression load in an axial direction thereof. Further, FIG. 4 shows the impact-absorbing member 12 having a regular hexagonal shape in cross section, i.e., a regular N-polygonal shape at N=6. The wood member 22 and the frame body 32 may be made of the same material as the wood member 21 and the frame body 31 of Embodiment 1 described above and may be simply different therefrom in shape.

The frame body 32 may have a regular N-polygonal cylindrical shape having the same N-number as the wood member 22, i.e., a hollow cylindrical shape having a hollow regular N-polygonal shape in cross section. The frame body 32 is capable of supporting the wood member 22 and capable of deforming with the wood member 22 when the compression load in an axial direction is applied thereto. The frame body 32 may be closely fitted around the wood member 22 without clearance, so as to cover the entire side surfaces of the wood member 22 in just proportion. A thickness of the frame body 32 may substantially be uniform and may be appropriately determined provided that the frame body 32 can be deformed with the wood member 22. The thickness of the frame body 32 can be determined without taking into account a balance against an outer size of the wood member 23.

When the compression load in the axial direction acts on the impact-absorbing member 12, the frame body 32 can be crashed in the axial direction while it is repeatedly expanded outward only although the principle is not necessarily known. At the same time, the wood member 22 can directly undergo compression deformation in an axial direction while it is prevented from falling down by the frame body 32. According to the impact-absorbing member 12, when the compression load in the axial direction is applied thereto, the frame body 32 encircling the wood member 21 may be crashed without changing the axial direction thereof. Therefore, the wood member 22 can linearly undergo compression deformation in the fiber direction without falling down. At this time, the frame body 32 can be crashed while it is expanded outward without protruding inward. Therefore, the frame body 32 may be less likely to bite into the wood member 22. This allows the wood member 22 to exploit its innate characteristics at maximum. Further, the frame body 32 and the wood member 22 may be less likely to interfere with each other. Therefore, the deformation behavior of the wood member can be prevented from being varied. Further, change of a reactive force can be minimized, so that variation of impact-absorbing performance can be minimized.

Figure 5:
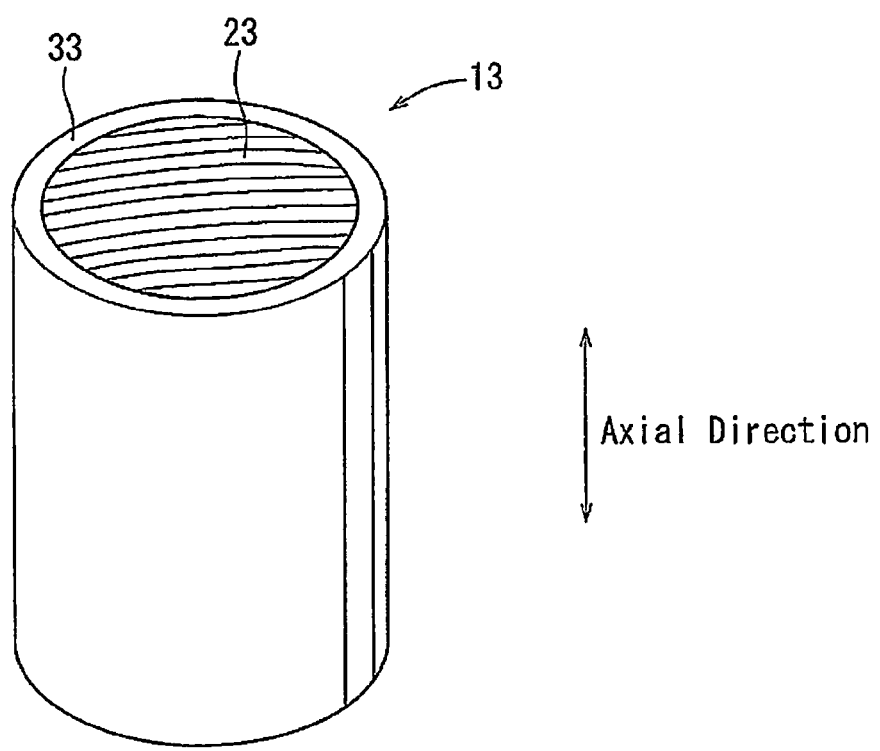
FIG. 5 is a perspective view of an impact-absorbing member according to Embodiment 3.

As shown in FIG. 5, an impact-absorbing member 13 of the present embodiment may be composed of a columnar-shaped wood member 23 having a precise circular shape in cross section, and a metal frame body 33 covering side-surfaces of the wood member 23. The impact-absorbing member 13 may function to receive a compression load in an axial direction thereof. The wood member 23 and the frame body 33 may be made of the same material as the wood member 21 and the frame body 31 of Embodiment 1 described above and may be simply different therefrom in shape.

The frame body 33 may have a precise cylindrical shape, i.e., a hollow cylindrical shape having a hollow precise circular shape in cross section. The frame body 33 is capable of supporting the wood member 23 and capable of deforming with the wood member 23 when the compression load in an axial direction is applied thereto. The frame body 33 may be closely fitted around the wood member 23 without clearance, so as to cover the entire side surfaces of the wood member 23 in just proportion. A thickness of the frame body 33 may substantially be uniform and may be appropriately determined such that the frame body 33 can be deformed with the wood member 23. Further, the thickness of the frame body 33 can be determined without taking into account a balance against an outer size of the wood member 23.

When the compression load in the axial direction acts on the impact-absorbing member 13, the frame body 33 encircling the wood member 23 can be crashed in the axial direction while it is repeatedly expanded outward only, although the principle is not necessarily known. At the same time, the wood member 23 can directly undergo compression deformation in an axial direction while it is prevented from falling down by the frame body 33. According to the impact-absorbing member 13, when the compression load in the axial direction is applied thereto, the frame body 33 encircling the wood member 23 may be crashed without changing the axial direction thereof. Therefore, the wood member 23 can linearly undergo compression deformation in the fiber direction without falling down. At this time, the frame body 33 can be crashed while it is folded outward without being folded inward. Therefore, the frame body 33 may be less likely to bite into the wood member 23. This allows the wood member 23 to exploit its innate characteristics at maximum. Further, the frame body 33 and the wood member 23 may be less likely to interfere with each other. Therefore, the deformation behavior of the wood member can be prevented from being varied. Further, change of a reactive force can be minimized, so that variation of impact-absorbing performance can be minimized.

Embodiment 4

Figure 6:
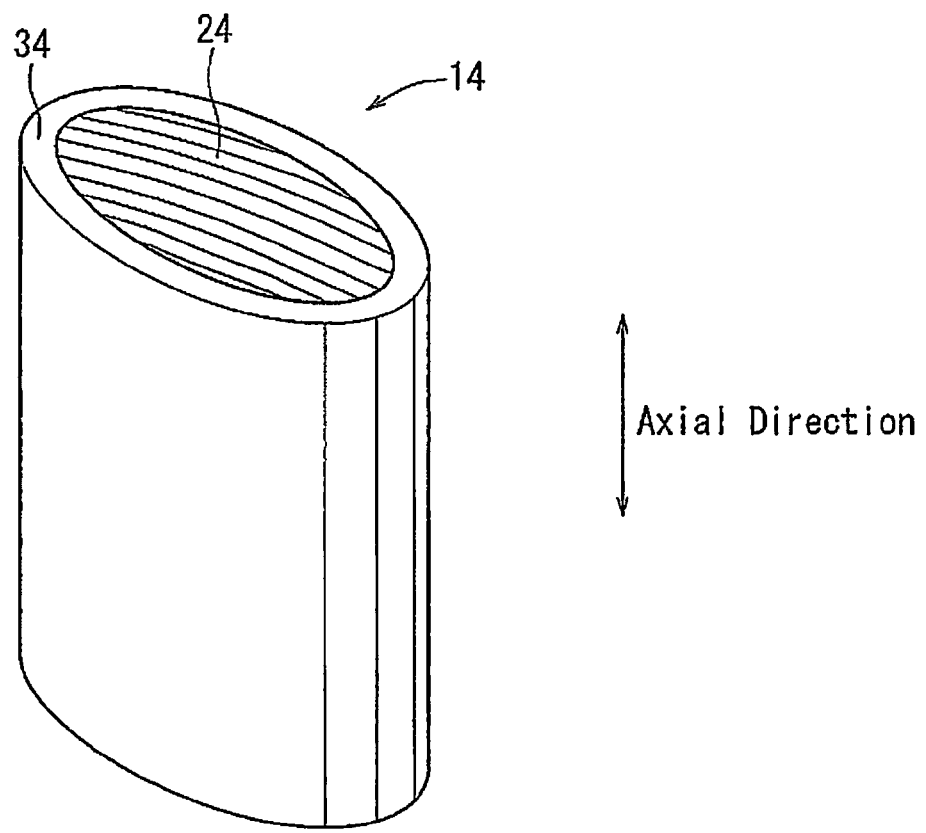
FIG. 6 is a perspective view of an impact-absorbing member according to Embodiment 4.

As shown in FIG. 6, an impact-absorbing member 14 of the present embodiment may be composed of a columnar-shaped wood member 24 having an elliptical shape in cross section, and a metal frame body 34 covering side-surfaces of the wood member 24. The impact-absorbing member 14 may function to receive a compression load in an axial direction thereof. The wood member 24 and the frame body 34 may be made of the same material as the wood member 21 and the frame body 31 of Embodiment 1 described above and may be simply different therefrom in shape.

Figure 7:
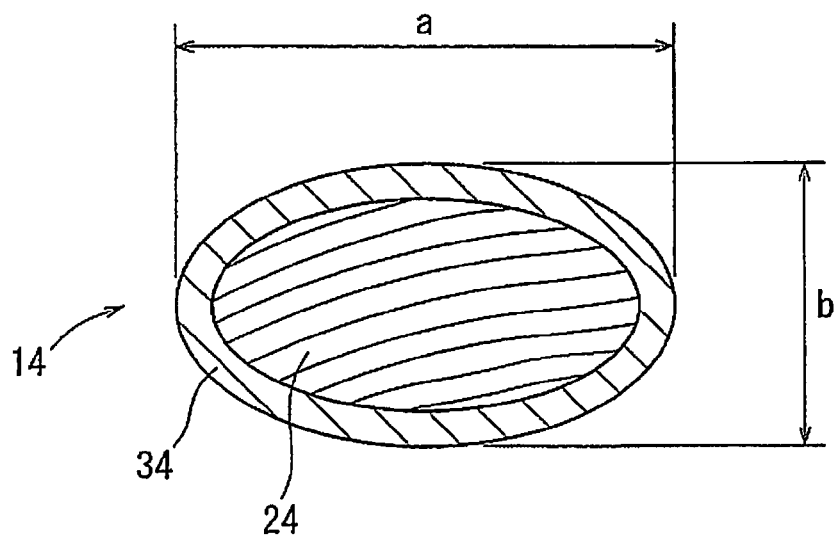
FIG. 7 is a sectional view taken along a line perpendicular to an axial direction of the impact-absorbing member of FIG. 6.

The frame body 34 may have an elliptical cylindrical shape, i.e., a hollow cylindrical shape having a hollow elliptical shape in cross section. A ratio of an inner major axis a to an inner minor axis b in a hollow elliptical cross-sectional surface of the frame body 34, i.e., a ratio a/b (which will be hereinafter referred to as a major axis to minor axis ratio), may be set to 3 or less (FIG. 7). Further, when the major axis to minor axis ratio is equal to 1, the cross-sectional surface may turn into a hollow precise circular shape. Therefore, more properly, the major axis to minor axis ratio may be set so as to satisfy $1 < a/b \leq 3$. The frame body 34 is capable of supporting the wood member 24 and capable of deforming with the wood member 24 when the compression load in an axial direction is applied thereto. The frame body 34 may be closely fitted around the wood member 24 without clearance, so as to cover the entire side surfaces of the wood member 24 in just proportion. A thickness of the frame body 34 may substantially be uniform and may be appropriately determined such that the frame body 34 can be deformed with the wood member 24.

When the compression load in the axial direction acts on the impact-absorbing member 14, the frame body 34 encircling the wood member 24 can be crashed in the axial direction while it is repeatedly expanded outward only, although the principle is not necessarily known. At the same time, the wood member 24 can undergo compression deformation. At this time, the frame body 34 can be crashed while it is folded outward without being folded inward. Therefore, the frame body 34 may be less likely to bite into the wood member 24. This allows the wood member 24 to appropriately exploit its innate characteristics. Further, the frame body 34 and the wood member 24 may be less likely to interfere with each other. Therefore, the deformation behavior of the wood member can be prevented from being varied. Further, change of a reactive force can be minimized, so that variation of impact-absorbing performance can be minimized.

EXAMPLES

Test 1

Test 1 was intended to determine innate impact-absorbing performance of a wood member. A square cedar wood member having a square shape in cross section (40 mm×40 mm×70 mm: a length in an axial direction) was prepared. The wood member was sawn up such that a fiber direction thereof can be aligned parallel with the axial direction (a compression direction). The wood member was set on a compression testing machine (Autograph AG-100KNE) manufactured by Shimazu Corporation while it is not encircled by a frame body. The wood member was compressed in the axial direction under conditions of 2 mm/min, and a relationship between displacement (an amount of compression) and a compression load (i.e., a reactive force produced by an impact-absorbing member) was measured. Results are shown in FIG. 8.

Figure 8:
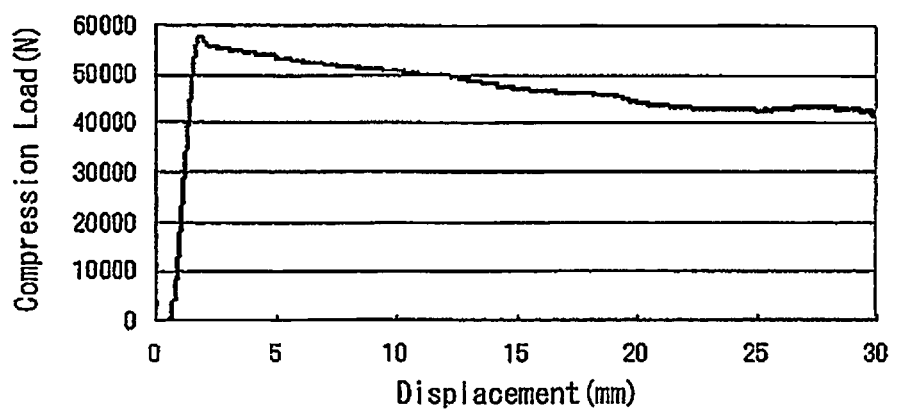
FIG. 8 is a graph illustrating a relationship between a displacement and a compression load, which is obtained from Test 1 with regard to a square cedar wood member.

As will be apparent from FIG. 8, when the wood member is compressed in the fiber direction thereof, the compression load may continue to be extremely stable. This demonstrates that the wood member may have high impact-absorbing performance.

Test 2

In Test 2, test pieces Nos. 1 and 2 of the impact-absorbing member were prepared according to Embodiment 1. Each test piece was composed of a wood member having a square shape in cross section, and a hollow cylindrical frame body fitted around the wood member. A square cedar member was used as the wood member. Further, an extrusion molded article of aluminum (A5052) was used as the frame body. Sizes of each test piece are described in Table 1. Further, an outer side L in a hollow square cross-sectional surface and a thickness T of the frame body shown in Table 1 may correspond to the sizes L and T shown in FIG. 2.

TABLE 1

| Test Piece No. | Outer Side L in Hollow Square Cross-Sectional Surface (mm) | Thickness T of Frame Body (mm) | Length in Axial Direction (mm) | Side L/ Thickness T |
|---|---|---|---|---|
| 1 | 16 | 0.5 | 50 | 32 |
| 2 | 15 | 1.5 | 50 | 10 |

Figure 9:
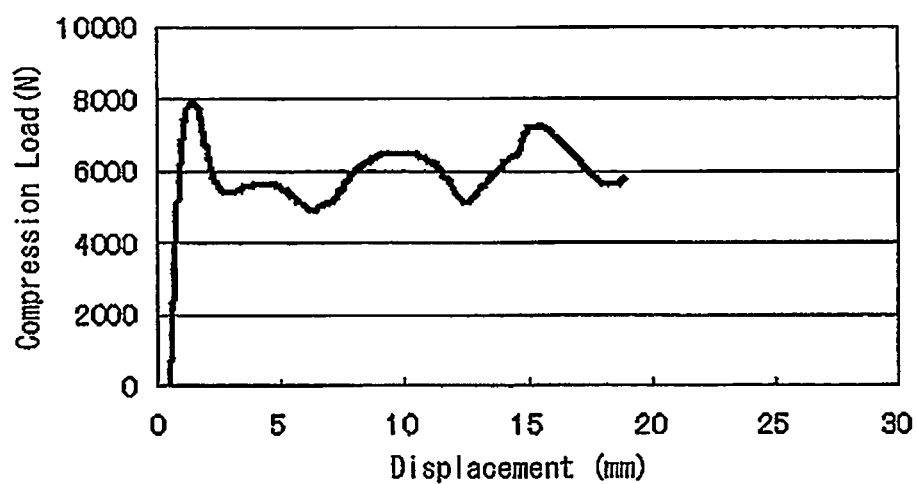
FIG. 9 is a graph illustrating a relationship between a displacement and a compression load, which is obtained from Test 2 with regard to a test piece No. 1 shown in Table 1.
Figure 10:
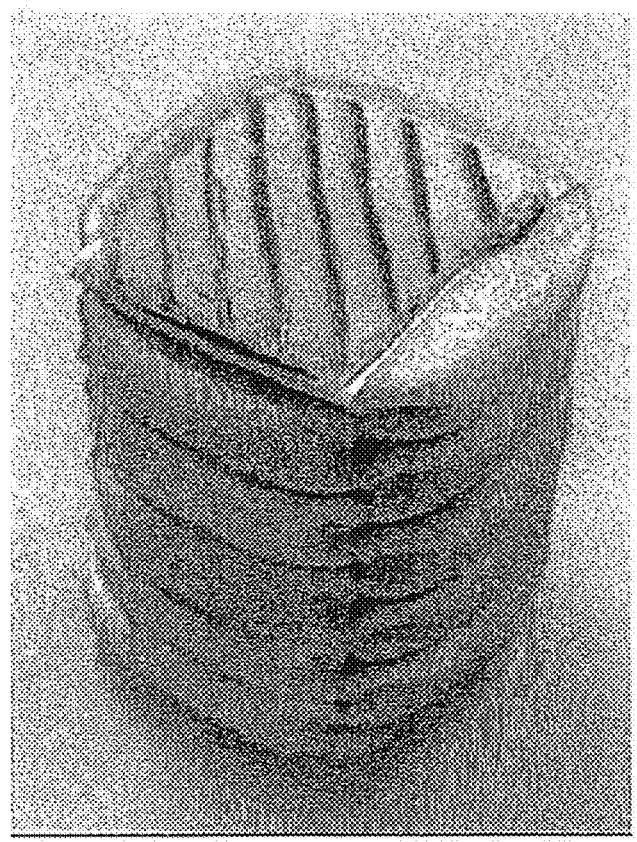
FIG. 10 is an appearance picture of the test piece No. 1 shown in Table 1, which is viewed obliquely after it is compressed in Test 2.

Next, the test piece No. 1 was compressed in the axial direction in the same manner as Test 1, and a relationship between displacement and a compression load was measured. In addition, only the frame body was similarly compressed, and a relationship between displacement and a compression load was measured. Thereafter, a result obtained about only the frame body was subtracted from a result obtained about the test piece in which the frame body was fitted around the wood member, so as to obtain a relationship between displacement and the compression load about only the wood member contained in the test piece. Results are shown in FIG. 9. An appearance of the test piece after compression is shown in pictures in FIG. 10. Similar to the test piece No. 1, with regard to the test piece No. 2, a relationship between displacement and the compression load about the wood member contained in the test piece was obtained. Results are shown in FIGS. 11 and 12.

Figure 11:
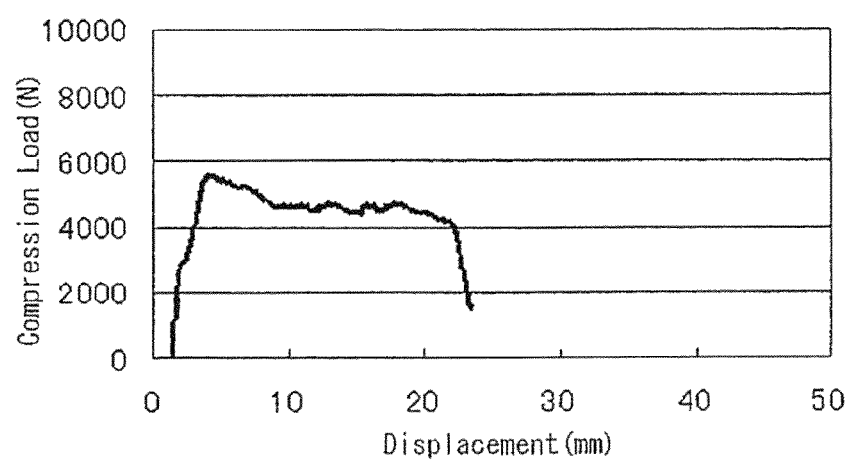
FIG. 11 is a graph illustrating a relationship between a displacement and a compression load, which is obtained from Test 2 with regard to a test piece No. 2 shown in Table 1.
Figure 12:
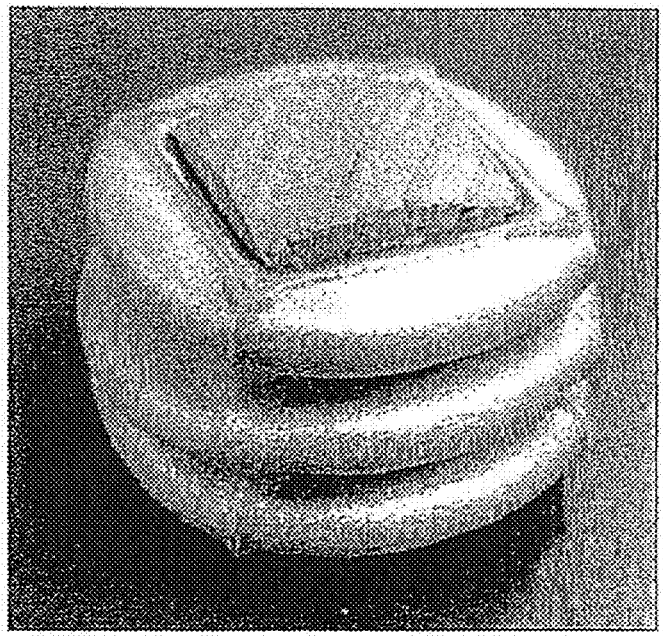
FIG. 12 is an appearance picture of the test piece No. 2 shown in Table 1, which is viewed obliquely after it is compressed in Test 2.

As will be apparent by comparing graphs shown in FIGS. 9 and 11 each of which shows a relationship between displacement and the compression load about the wood member contained in the test piece, in the test piece No. 2 in which the ratio L/T of the side in the cross-sectional surface to the thickness is 10, change of the compression load may be quite small in comparison with the test piece No. 1 in which the ratio L/T of the side in the cross-sectional surface to the thickness is 20. Further, similar to the results of Test 1 in which only the wood member is compressed, the compression load of the wood member contained in the test piece No. 2 may be stable. Next, in view of deformation forms of the test pieces, deformation configurations of the frame bodies contained in the test pieces may be different from each other although the wood members contained in the test pieces may undergo compression deformation without falling down. As shown in pictures in FIG. 10, in the test piece No. 1, the frame body may be crashed while its wall surfaces adjacent to each other are folded alternately inward and outward. As a result, the frame body folded inward may bite into the wood member. To the contrary, as shown in pictures in FIG. 12, in the test piece No. 2, the frame body may be crashed while its all circumferences are repeatedly deformed and bulged to spread outward. Further, in the test piece No. 2, the frame body may be crashed without protruding inward. That is, the frame body may not bite into the wood member. The results clearly show that in the test piece having a square shape in cross section, only when the ratio L/T of the side in the cross-sectional surface to the thickness has a particular value, the frame body can be compressed while it is bulged outward only, so as to be prevented from biting into the wood member. This means that the wood member can appropriately exploit its innate characteristics so as to stabilize the compression load.

Test 3

In Test 3, test pieces each of which is composed of only a hollow cylindrical frame body having a square shape in transverse cross section were prepared. Similar to Test 2, the test pieces were compressed in the same manner as Test 1, and deformation forms of the test pieces were observed. The test pieces after compression are shown in pictures in FIGS. 13-16. Further, in Test 3, frame bodies A to D respectively formed by extrusion molding of aluminum (A5052) were used as the test pieces. Each of the frame bodies A-D was configured such that an outer side L in a hollow square cross-sectional surface and a length in an axial direction were respectively 20 mm and 70 mm. However, the frame bodies A-D were respectively configured to have different thicknesses. Sizes of each of the frame bodies are described in Table 2. Further, the compression deformation forms of the frame bodies are also described in Table 2. Further, when the frame body was crashed while it is folded alternately inward and outward as the test piece No. 1 in Test 2, the compression deformation form thereof is labeled as "unsuitable" in Table 2. Instead, when the frame body was crashed while it is bulged outward only as the test piece No. 2 in Test 2, the deformation form thereof is labeled as "good" in Table 2.

TABLE 2

| Test Piece. | Thickness T (mm) | Side L/ Thickness T | Compression Deformation Forms |
| --- | --- | --- | --- |
| A | 1.6 | 12.5 | Unsuitable |
| B | 1.8 | 11.1 | Good |
| C | 2.2 | 9.1 | Good |
| D | 2.5 | 8.0 | Unsuitable |

Figure 13:
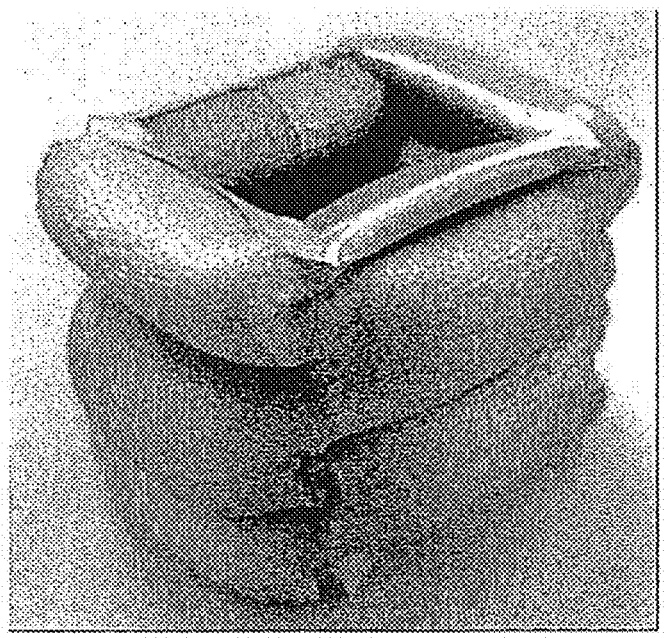
FIG. 13 is an appearance picture of a frame body A shown in Table 2, which is viewed obliquely after it is compressed in Test 3.
Figure 14:
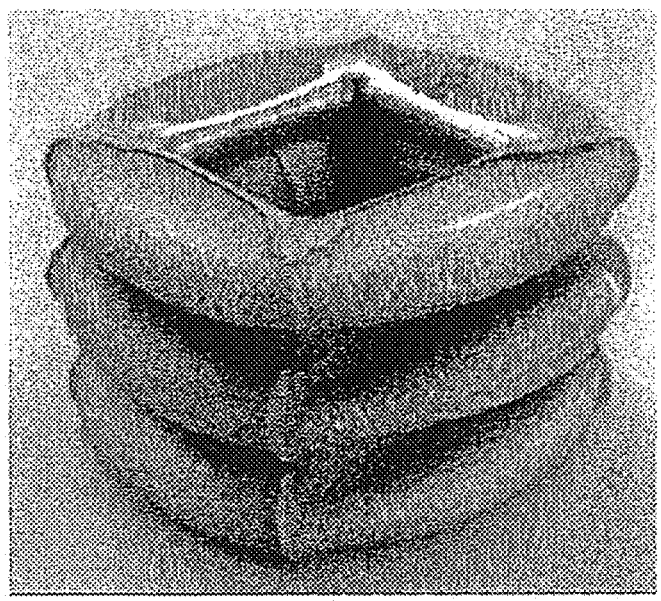
FIG. 14 is an appearance picture of a frame body B shown in Table 2, which is viewed obliquely after it is compressed in Test 3.
Figure 15:
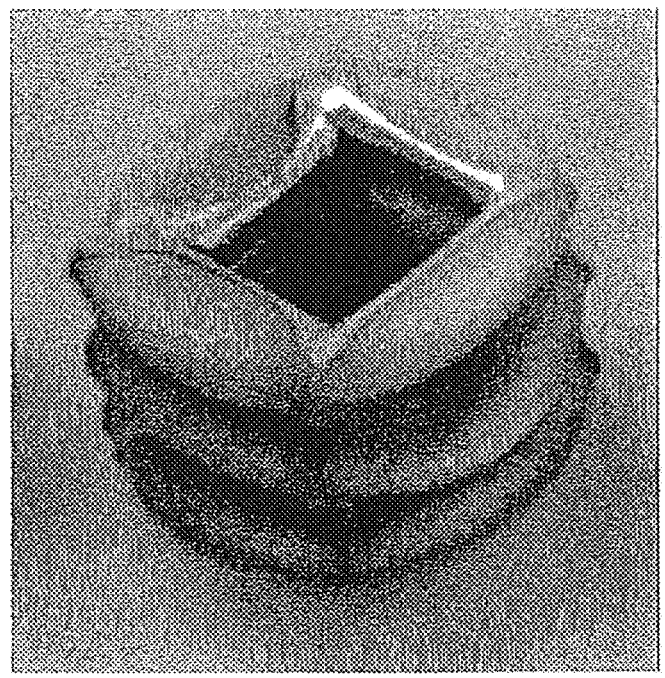
FIG. 15 is an appearance picture of a frame body C shown in Table 2, which is viewed obliquely after it is compressed in Test 3.
Figure 16:
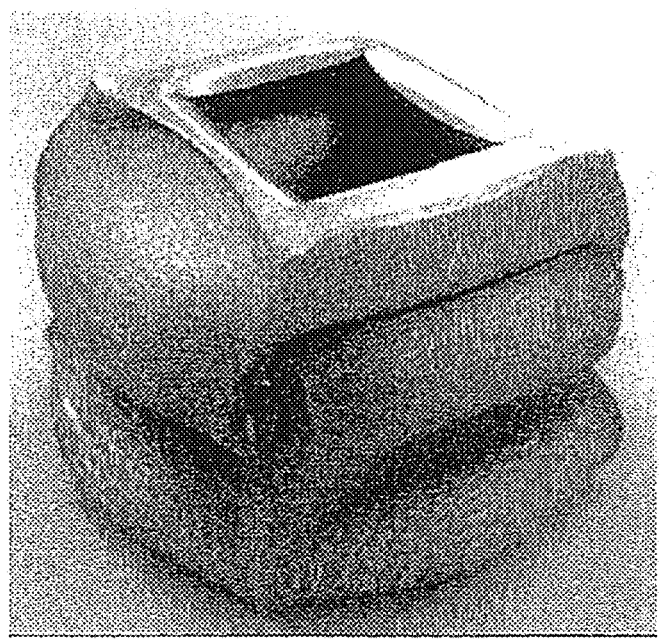
FIG. 16 is an appearance picture of a frame body D shown in Table 2, which is viewed obliquely after it is compressed in Test 3.

The results described in Table 2 clearly show that when the ratio L/T of the side in the cross-sectional surface of the frame body to the thickness is set to a range of 9-12, the frame body may be crashed while its all circumferences are repeatedly deformed and bulged to spread outward and can be prevented from protruding inward (FIGS. 14 and 15). Conversely, the results show that when the ratio L/T of the side in the cross-sectional surface of the frame body to the thickness is out of the range of 9-12, the frame body may be crashed while its wall surfaces adjacent to each other are folded alternately inward and outward and a portion of the frame body may protrude inward (FIGS. 13 and 16).

Test 4

In Test 4, similar to Test 3, hollow cylindrical frame bodies each having a square shape in transverse cross section were used as test pieces. Similar to Test 3, the test pieces were compressed, and deformation forms of the test pieces were observed. In Test 4, as described in Table 3, frame bodies E to K that are also different from each other in an outer side L in a hollow square cross-sectional surface and a length in an axial direction were used as the test pieces. In Test 4, the test pieces were respectively formed by extrusion molding of aluminum (A6063). Similar to Test 3, compression deformation forms of the test pieces are also described in Table 3.

TABLE 3

Figure 17:
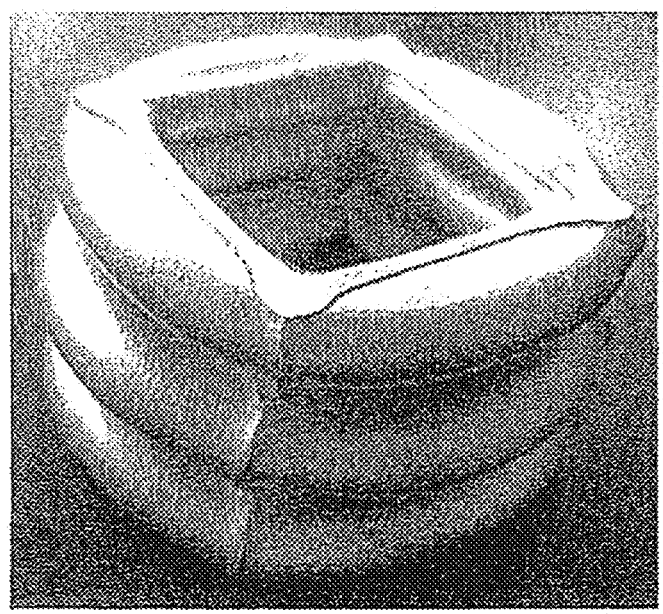
FIG. 17 is an appearance picture of a frame body K shown in Table 3, which is viewed obliquely after it is compressed in Test 4.

| Test Piece | Outer Side L in Hollow Square Cross-Sectional Surface (mm) | Thickness T (mm) | Length in Axial Direction (mm) | Side L/ Thickness T | Compression Deformation Forms |
| --- | --- | --- | --- | --- | --- |
| E | 10 | 0.9 | 20 | 11.1 | Good |
| F | 10 | 0.9 | 40 | 11.1 | Good |
| G | 15 | 1.4 | 20 | 10.7 | Good |
| H | 15 | 1.4 | 40 | 10.7 | Good |
| I | 25 | 2.4 | 40 | 10.4 | Good |
| J | 25 | 2.4 | 60 | 10.4 | Good |
| K | 25 | 2.4 | 80 | 10.4 | Good (FIG. 17) |

The results described in Table 3 demonstrate that even when the outer side L in a hollow square cross-sectional surface and the length in an axial direction are changed, the frame body may be crashed while its all circumferences are repeatedly deformed and bulged to spread outward and may not protrude inward provided that the ratio L/T of the side in the cross-sectional surface to the thickness is in the range of 9-12. The frame body K after compression is representatively shown in pictures in FIG. 17.

Test 5

In Test 5, as described in Table 4, hollow cylindrical frame bodies each having a rectangular shape in cross section were used as test pieces. Similar to Tests 3 and 4, the test pieces were compressed, and deformation forms of the test pieces were observed. Similar to Tests 3 and 4, the results of compression are also described in Table 4. In Test 5, the test pieces were respectively formed by extrusion molding of aluminum (A6063). Further, an outer short side and an outer long side described in Table 4 respectively mean lengths of an outer short side and an outer long side of a hollow rectangular cross-sectional surface.

TABLE 4

Figure 18:
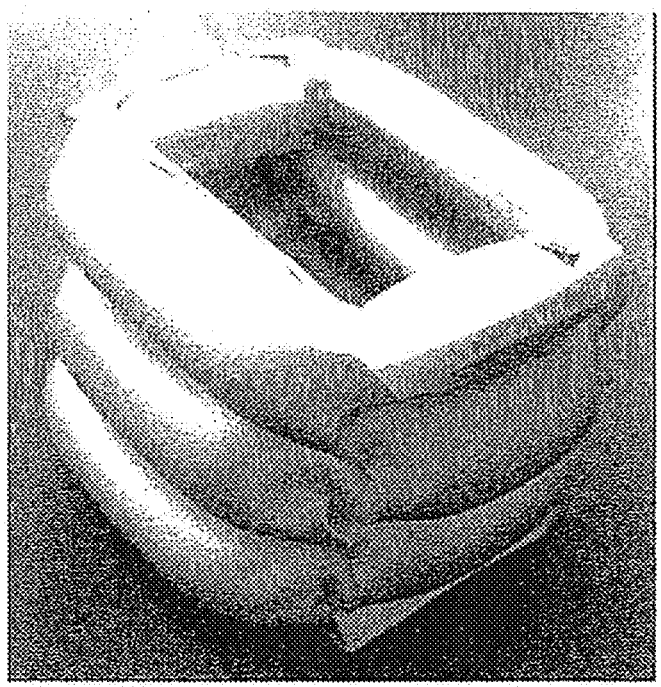
FIG. 18 is an appearance picture of a frame body S shown in Table 4, which is viewed obliquely after it is compressed in Test 5.
Figure 19:
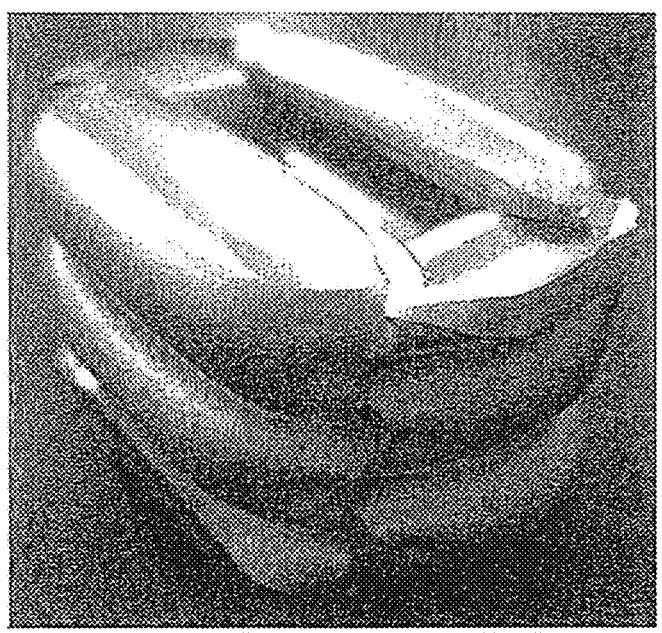
FIG. 19 is an appearance picture of a frame body V shown in Table 4, which is viewed obliquely after it is compressed in Test 5.
Figure 20:
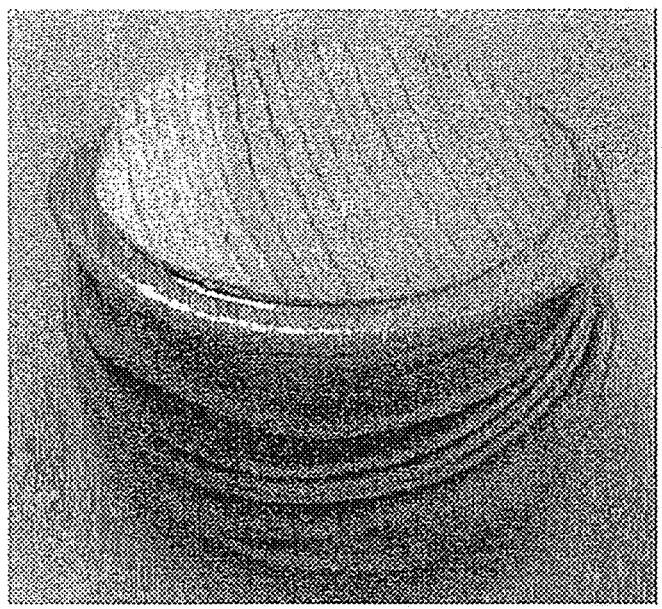
FIG. 20 is an appearance picture of a test piece No. 3 shown in Table 5, which is viewed obliquely after it is compressed in Test 6.
Figure 21:
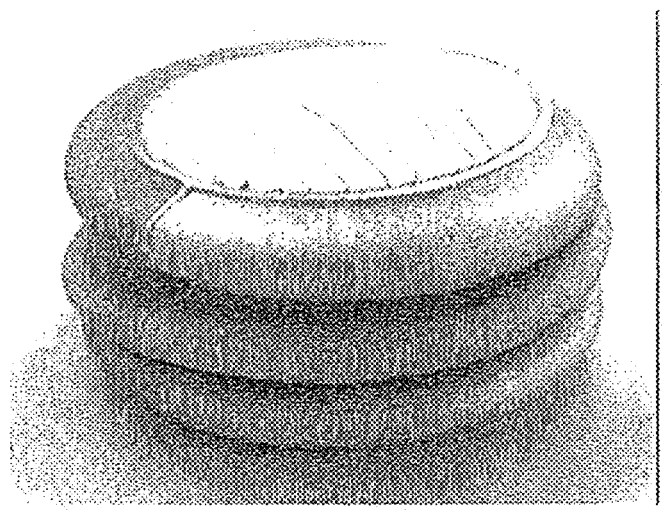
FIG. 21 is an appearance picture of a test piece No. 4 shown in Table 5, which is viewed obliquely after it is compressed in Test 6.
Figure 22A:
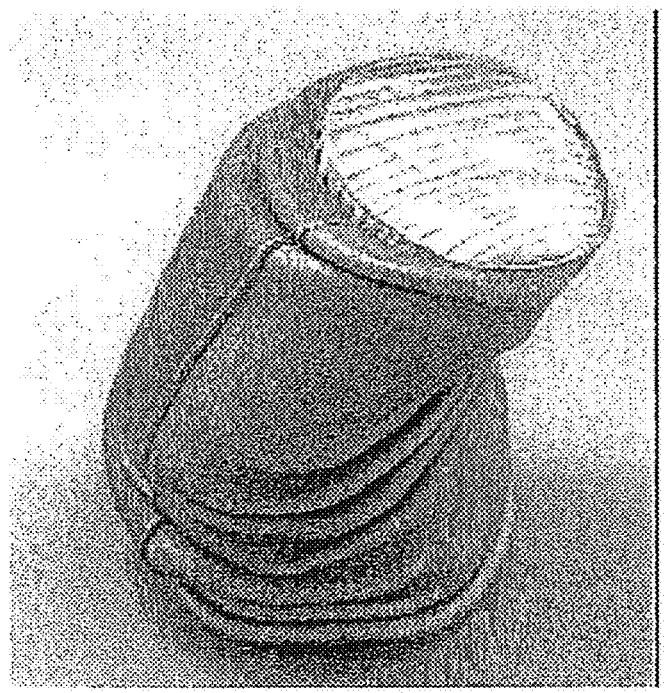
FIG. 22A is an appearance picture of a test piece No. 5 shown in Table 5, which is viewed obliquely after it is compressed in Test 6.
Figure 22B:
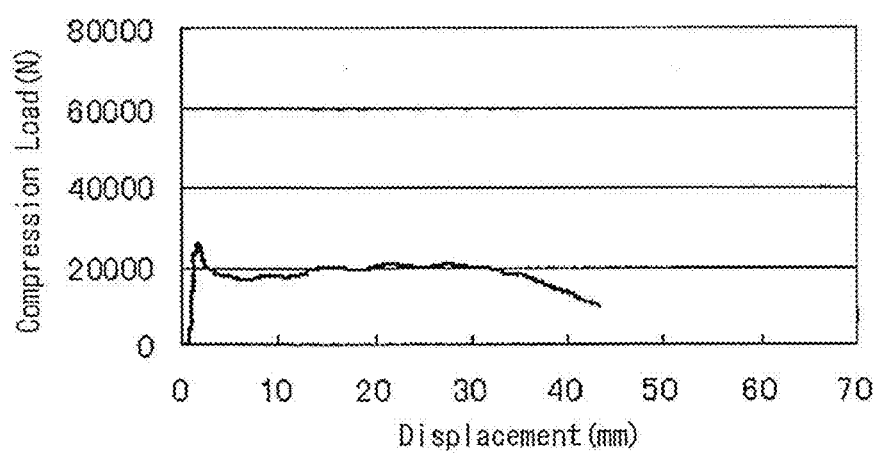
FIG. 22B is a graph illustrating a relationship between a displacement and a compression load, which is obtained from Test 6 with regard to the test piece No. 5 shown in Table 5.
Figure 23:
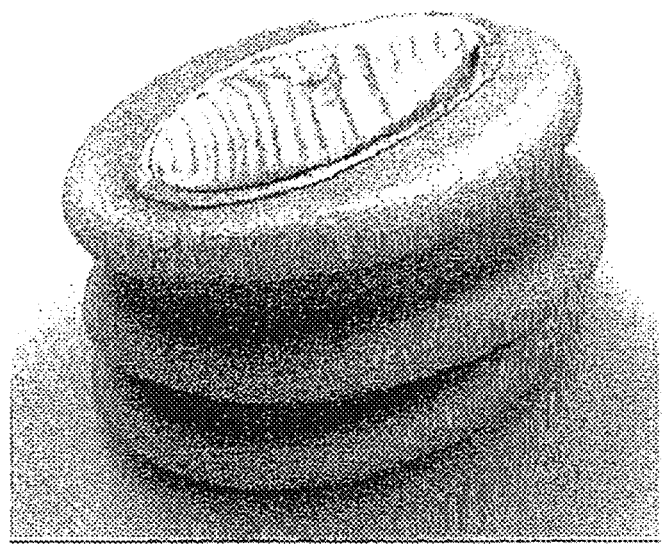
FIG. 23 is an appearance picture of a test piece No. 6 shown in Table 5, which is viewed obliquely after it is compressed in Test 6.
Figure 24:
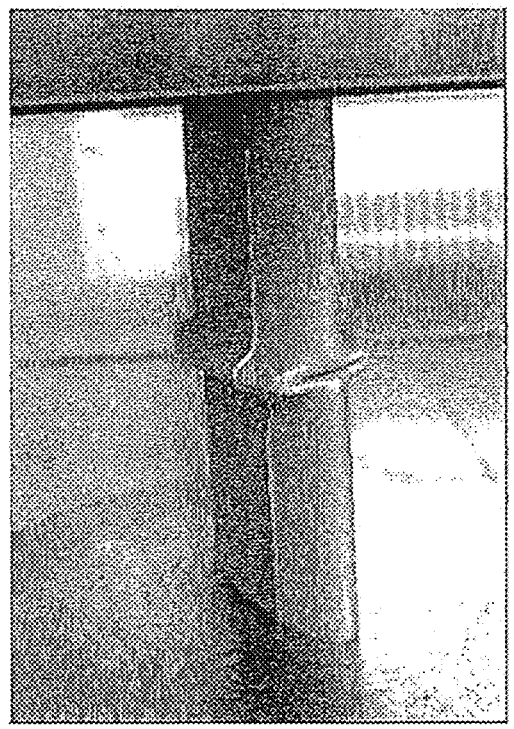
FIG. 24 is an appearance picture of a test piece No. 7 shown in Table 5, which is viewed obliquely after it is compressed in Test 6.
Figure 25:
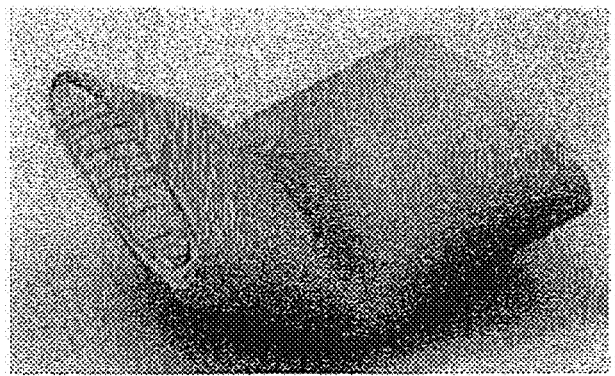
FIG. 25 is an appearance picture of a test piece No. 8 shown in Table 5, which is viewed obliquely after it is compressed in Test 6.

| Test Piece | Outer Short Side (mm) | Outer Long Side (mm) | Length in Axial Direction (mm) | Thickness (mm) | Short Side/ Thickness | Long Side/ Thickness | Compression Deformation Forms |
| --- | --- | --- | --- | --- | --- | --- | --- |
| L | 10 | 15 | 20 | 1.00 | 10.0 | 15.0 | Unsuitable |
| M | 10 | 15 | 40 | 1.00 | 10.0 | 15.0 | Unsuitable |
| N | 15 | 30 | 20 | 1.50 | 10.0 | 15.0 | Unsuitable |
| O | 15 | 30 | 40 | 1.50 | 10.0 | 20.0 | Unsuitable |
| P | 15 | 30 | 60 | 1.50 | 10.0 | 20.0 | Unsuitable |
| Q | 20 | 30 | 40 | 1.85 | 10.8 | 16.2 | Unsuitable |
| R | 20 | 30 | 60 | 1.85 | 10.8 | 16.2 | Unsuitable |
| S | 20 | 30 | 80 | 1.85 | 10.8 | 16.2 | Unsuitable (FIG. 18) |
| T | 20 | 40 | 40 | 1.85 | 10.8 | 21.6 | Unsuitable |
| U | 20 | 40 | 60 | 1.85 | 10.8 | 21.6 | Unsuitable |
| V | 20 | 40 | 80 | 1.85 | 10.8 | 21.6 | Unsuitable (FIG. 19) |

As will be apparent from Table 4, in Test 5, even when a ratio of an outer short side in the rectangular cross-sectional surface of the frame body to a thickness (a short side to thickness ratio) is in the range of 9-12, the frame body may be crashed while it is folded alternately inward and outward and not while it is bulged outward only. The frame bodies S and V after compression are representatively shown in pictures in FIGS. 18 and 19. The results clearly show that when the frame body has a rectangular shape in cross section, in particular, when the frame body has a square shape in cross section, the frame body can be crashed while it is bulged outward only by setting the short side to thickness ratio to 9-12.

Test 6

In Test 6, test pieces Nos. 3-8 of the impact-absorbing member were prepared according to Embodiment 3 or 4. Each test piece was composed of a wood member having a rounded shape in transverse cross section, and a hollow cylindrical frame body fitted around the wood member. A sawn cedar member was used as the wood member. Further, an extrusion molded article of aluminum (A5052) was used as the frame body. Sizes of the test piece are described in Table 5. Further, a major axis a and a minor axis b shown in Table 5 may correspond to the sizes a and b shown in FIG. 7. Next, similar to Test 2, the test pieces Nos. 3-8 were compressed, and deformation forms of the test pieces were observed. The test pieces after compression are shown in pictures in FIGS. 20-25. Further, the compression deformation forms of the test pieces are also described in Table 5. In Table 5, when the frame body was crashed while it is bulged outward only, the deformation form thereof is labeled as "good." Further, when the deformation form is not good, it is annotated.

TABLE 5

| Test Piece No. | Shape in Cross Section | Major Axis a (mm) | Minor Axis b (mm) | Thickness of Frame Body (mm) | Major Axis a/ Minor Axis b | Compression Deformation Forms |
|---|---|---|---|---|---|---|
| 3 | Precise Circle | 40 | 40 | 0.5 | 1 | Good |
| 4 | Precise Circle | 40 | 40 | 2.0 | 1 | Good |
| 5 | Ellipse | 40 | 20 | 0.5 | 2 | Good |
| 6 | Ellipse | 40 | 20 | 2.0 | 2 | Good |
| 7 | Ellipse | 40 | 10 | 0.5 | 4 | [1] |
| 8 | Ellipse | 40 | 10 | 2.0 | 4 | [2] |

[1]: The frame body was crashed while it is folded inward and outward. Finally, the whole impact-absorbing member was buckled.
[2]: The whole impact-absorbing member was buckled.

The results of the test pieces Nos. 3-8 clearly show that when the test piece has a rounded shape in cross section, even if it is an elliptical shape other than a precise circular shape, the frame body can be crashed while its all circumferences are repeatedly deformed and bulged to spread outward regardless of the thickness of the frame body and can be prevented from protruding inward. Further, as shown in pictures in FIG. 22A, the test piece No. 5 having an elliptical shape in cross section and having a thin walled frame body may be diagonally crashed while an axis thereof is deflected. However, the frame body may be crashed while it is expanded outward without protruding inward and may not bite into the wood member. As a result, fiber of the wood member may not be randomly inclined. As shown by a graph in FIG. 22B, a compression load may continue to be stable. Further, the results of the test pieces Nos. 5-8 clearly show that when the test piece has an elliptical shape in cross section, the whole test piece may be likely to buckle as an ellipse is excessively flattened. This demonstrates that a ratio a/b of the major axis to the minor axis in an elliptical cross-sectional surface may preferably be set to 3 or less.

The results of Tests 2-6 suggest that as the test piece changes from a rectangular shape toward a circular shape in cross section, the test piece may be likely to crash while it is expanded outward only regardless of the thickness of the frame body and flatness in cross section. Therefore, in subsequent Test 7, deformation forms were examined with regard to test pieces each having a polygonal shape closer to the circular shape than the rectangular shape in cross section.

Test 7

In Test 7, test pieces Nos. 9-12 of the impact-absorbing member each having a polygonal shape in cross section were prepared according to Embodiment 2. A sawn cedar member was used as a wood member. Further, an extrusion molded article of aluminum (A5052) was used as a frame body. Shapes and sizes of the test piece are described in Table 6. Next, similar to Test 7, the test pieces Nos. 9-12 were compressed, and deformation forms of the test pieces were observed. The compression deformation forms of the test pieces are additionally described in Table 6. In Table 6, when the frame body was crashed while it is bulged outward only, the deformation form thereof is labeled as "good."

TABLE 6

Figure 26:
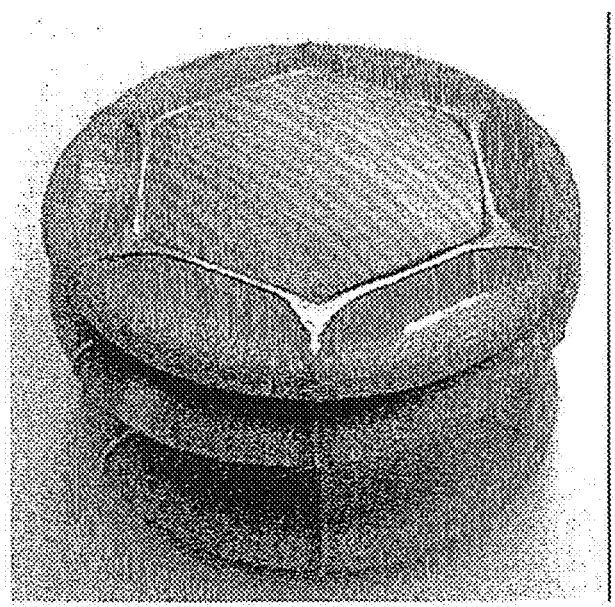
FIG. 26 is an appearance picture of a test piece No. 11 shown in Table 6, which is viewed obliquely after it is compressed in Test 7.
Figure 27:
FIG. 27 is an appearance picture of a test piece No. 12 shown in Table 6, which is viewed obliquely after it is compressed in Test 7.

| Test Piece No. | Shape in Cross Section | Outer Side [1] (mm) | Thickness of Frame Body (mm) | Length in Axial Direction (mm) | Compression Deformation Forms |
|---|---|---|---|---|---|
| 9 | Regular Hexagon | 16 | 0.5 | 70 | Good |
| 10 | Regular Hexagon | 16 | 1.0 | 70 | Good |
| 11 | Regular Hexagon | 16 | 1.6 | 70 | Good (FIG. 26) |
| 12 | Regular Octagon | 12 | 1.2 | 70 | Good (FIG. 27) |

[1]: A length of an outer side in a hollow regular polygonal cross-sectional surface.

The results of the test pieces Nos. 9-12 clearly show that when the test piece has a regular hexagonal shape in cross section, the frame body can be crashed while its all circumferences are repeatedly deformed and bulged to spread outward regardless of the thickness thereof and can be prevented from protruding inward. The test piece No. 11 after compression are representatively shown in pictures in FIG. 26. Also, as shown in pictures in FIG. 27, it is recognized that when the test piece has a regular octagonal shape in cross section, the frame body can be crashed while its all circumferences are repeatedly deformed and bulged to spread outward and can be prevented from protruding inward. This demonstrates that a regular N-polygonal shape in cross section satisfying N≥5 may preferably be used.

The invention claimed is:
1. A vehicle impact-absorbing member having a columnar wood member and a hollow cylindrical metal frame body covering side-surfaces of the wood member and configured to axially receive a compression load caused by impact in the event of a collision in an axial direction of the wood member,
   wherein the wood member extends over the entire length of the frame body and is closely fitted in the frame body, and
   wherein the frame body has a square cylindrical shape, and wherein a ratio of an outer side in a hollow square cross-sectional surface of the frame body to a thickness of the frame body is set to a range of 9-12.

* * * * *